United States Patent [19]

Sato et al.

[11] Patent Number: 5,727,116
[45] Date of Patent: Mar. 10, 1998

[54] IMAGE SIGNAL RECORDING DEVICE WITH DIVIDED SIGNAL FRAME

[75] Inventors: Koichi Sato; Yasuhiro Yamamoto, both of Tokyo, Japan

[73] Assignee: Asahi Kogaku Kogyo Kabushiki Kaisha, Tokyo, Japan

[21] Appl. No.: 72,436

[22] Filed: Jun. 7, 1993

[30] Foreign Application Priority Data

Jun. 9, 1992 [JP] Japan ................................. 4-174716
Jun. 9, 1992 [JP] Japan ................................. 4-174717

[51] Int. Cl.$^6$ ............................................. H04N 5/91
[52] U.S. Cl. ................................. 386/122; 386/125
[58] Field of Search ............................. 360/35.1, 33.1, 360/32, 48, 11.1; 358/342, 313, 310, 335; 386/122, 125

[56] References Cited

U.S. PATENT DOCUMENTS

| | | | |
|---|---|---|---|
| 4,090,223 | 5/1978 | Holt | 360/35.1 |
| 4,939,586 | 7/1990 | Nabati et al. | 358/342 |
| 5,111,303 | 5/1992 | Senso et al. | 358/335 |

FOREIGN PATENT DOCUMENTS

| | | |
|---|---|---|
| 01161526 | 6/1989 | Japan. |
| 5-30461 | 2/1993 | Japan. |
| 2068628 | 8/1981 | United Kingdom. |

OTHER PUBLICATIONS

English Language abstract of Japanese Patent No. 5-30461.
Translation—JP 01-161526.

*Primary Examiner*—Andrew L. Sniezek
*Attorney, Agent, or Firm*—Greenblum & Bernstein, P.L.C.

[57] ABSTRACT

An image signal recording device in which one frame is divided into an upper half frame and a lower half frame by a straight line parallel to horizontal scanning lines forming the frame. In the upper half frame, image signals of a first field are recorded in horizontal scanning lines from 22H through 262H, and image signals of a second field are recorded in horizontal scanning lines from a mid portion of 284H through 525H. In the lower half frame, image signals of the first field are recorded in horizontal scanning lines from 22H through a mid portion of 263H, and image signals of the second field are recorded in horizontal scanning lines from 285H through 525H.

31 Claims, 15 Drawing Sheets

IMAGE SIGNAL RECORDING DEVICE WITH DIVIDED SIGNAL FRAME

BACKGROUND OF THE INVENTION

1. Field of the Invention

The present invention relates to an image signal recording device in which image signals corresponding to one frame are divided into a plurality of partial image signals to be recorded in a recording material such as a magnetic disk.

2. Description of the Related Art

Conventionally, a still video device is constructed in such a manner that image signals generated in accordance with a standard television mode (the NTSC mode, for example) are recorded on a track of a magnetic disk in accordance with a still video format. The bandwidth of the image signals are limited, due to the construction of the disk device, and thus, cannot be freely expanded. Accordingly, in a conventional still video device, when image signals having a high quality or broad bandwidth are inputted to the still video device, the image resolution is limited, and thus, the quality of the image is lowered.

In Japanese Unexamined Patent Publication No. 5-30461, a still video device by which high definition images recorded in the HDTV (High Definition TV) mode, for example, are recorded on a magnetic disk, is disclosed. In this still video device, image signals corresponding to one image are divided into a plurality of partial image signals by a straight line or lines extending in a horizontal direction, and the partial image signals corresponding to the divided frames are recorded on tracks of the magnetic disk.

Since horizontal scanning lines forming one frame image are slightly inclined relative to the straight line horizontally extending and dividing the frame, a horizontal scanning line positioned at the center of the frame is divided by the straight line. Accordingly, when the partial image signals are reproduced and combined with each other, a connecting point is formed at the mid portion of the horizontal scanning line which has been divided, which causes noise at the center of the frame.

This phenomenon is described below in more detail.

A frame is divided into an upper partial frame and a lower partial frame by a straight line extending in a horizontal direction. The lowermost horizontal scanning line is ended at the mid point thereof in the upper frame, and the uppermost horizontal scanning line is ended at the mid point thereof in the lower frame. Namely, the mid point of the lowermost horizontal scanning line and the mid point of the uppermost horizontal scanning line are connected to each other at the central point of the frame. The horizontal scanning lines in the upper frame are recorded on a first track of a magnetic disk, and the horizontal scanning lines in the lower frame are recorded on a second track of the magnetic disk.

Since image signals are recorded on the magnetic disk in the form of an analog signal, due to the magnetic characteristic of the magnetic disk and the like, a signal may not be exactly recorded on the magnetic disks or may not be exactly reproduced from the magnetic disk, regarding the mid point of the lowermost horizontal scanning line or the mid point of the uppermost horizontal scanning line. As a result, the connecting point of the horizontal scanning lines may occur in the frame image as noise.

SUMMARY OF THE INVENTION

Therefore, an object of the present invention is to provide an image signal recording device in which one frame is divided into a plurality of partial frames by a straight line extending in a horizontal direction to record image signals corresponding to the partial frames on a magnetic disk, and in which noise does not occur at the central portion of the frame when reproducing the divided image signals.

According to the present invention, there is provided an image signal recording device comprising dividing means and recording means. The dividing means divides one frame into a plurality of partial frames by at least one straight line parallel to horizontal scanning lines, to define partial image signals corresponding to each of the partial frames. The recording means records the partial image signals on separate recording areas of a recording medium.

Further, according to the present invention, there is provided a device for recording image signals on a recording mediums the image signals being generated in the High Definition TV mode, and being formed by a plurality of horizontal scanning lines. The device comprises storing means, defining means and recording means. The storing means stores the image signals in a memory by subsampling. The first partial image signals correspond to an upper partial frame, the second partial image signals correspond to a lower partial frame, the upper partial frame and the lower partial frame form one frame, and are divided by a straight line parallel to the scanning lines. The recording means records the first and second partial image signals on first and second recording areas of the recording medium.

Still further, according to the present invention, there is provided a device for recording image signals of one frame on a recording medium, the image signals being formed by a plurality of horizontal scanning lines. The device comprises a memory for storing the image signals, defining means and recording means. The defining means defines first and second partial image signals which form the image signals of one frame, the first partial image signals correspond to an upper partial frame, the second partial image signals correspond to a lover partial frame, the upper partial frame and the lower partial frame form one frame, and are divided by a line parallel to the horizontal scanning lines. The recording means records the first and second partial image signals on first and second recording areas of the recording medium.

Furthermore, according to the present inventions there is provided a device for recording image signals on a recording medium, the image signals being formed by a plurality of horizontal scanning lines. The device comprises first recording means and second recording means. The first recording means records first image signals in which the last horizontal scanning line is ended at a midpoint thereof. The second recording means records second image signals in which the first horizontal scanning line is started at a midpoint thereof. The last horizontal scanning line of the first image signals and the first horizontal scanning line of the second image signals form one horizontal scanning line which is located at an end portion of one frame.

Further, according to the present invention, there is provided a still video device comprising first recording means, second recording means and reproducing means. The first recording means records first image signals in a recording medium, the first image signals being formed by a plurality of horizontal scanning lines, and the last horizontal scanning line of the first image signals being ended at a midpoint thereof. The second recording means records second image signals in the recording medium. The second image signals are formed by a plurality of horizontal scanning lines. The first horizontal scanning line of the second image signals are started at a midpoint thereof. The reproducing means reproduces first and second image signals recorded on the recording medium. The reproducing means connects the last horizontal scanning line of the first image signals and the first horizontal scanning line of the second image signals to reproduce a horizontal scanning line located at an end portion of one frame.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
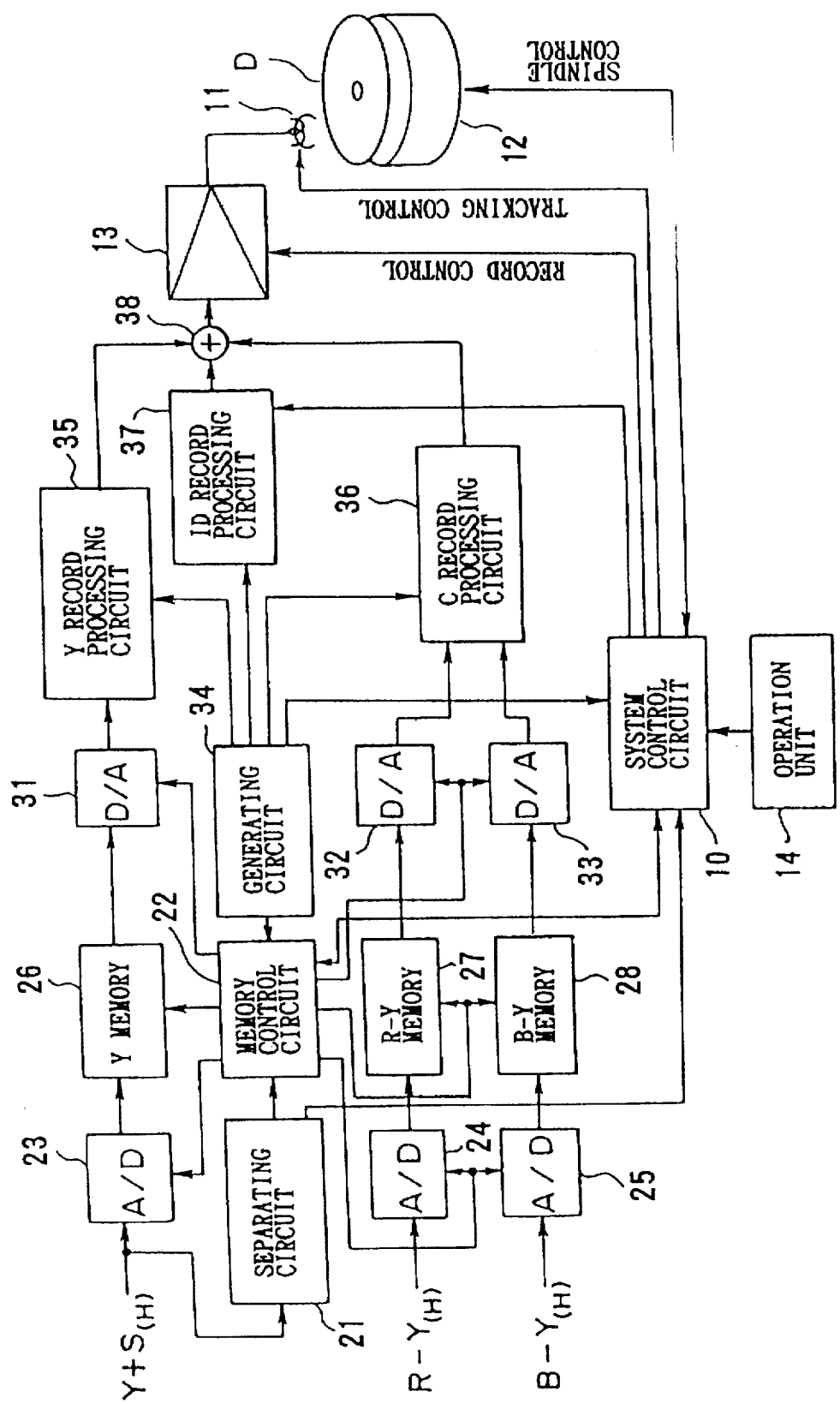
FIG. 1 is a block diagram showing a recording system of a still video device to which an embodiment of the present invention is applied.

The present invention will now be described with reference to embodiments shown in the drawings.

FIG. 1 is a block diagram showing a recording system of a still video device according to an embodiment of the present invention.

A system control circuit 10 is a microcomputer for controlling the still video device as a whole; the still video device having a magnetic head 11 and a spindle motor 12 for rotating a magnetic disk D. The magnetic head 11 is controlled by the system control circuit 10 to be displaced along a radial direction of the magnetic disk D, and thus positioned at a predetermined track of the magnetic disk D. The spindle motor 12 is controlled by the system control circuit 10 to rotate the magnetic disk D at a rotation speed of 3600 rpm, for example. During the rotation of the magnetic disk D, the magnetic head 11 is positioned at a predetermined track of the magnetic disk D to record image signals and identification (ID) codes on this track. A recording amplifier 13 is controlled by the system control circuit 10 and outputs image signals, ID codes and other signals to the magnetic head 11. Note, the magnetic disk D has 52 tracks, and the image signals and the other signals are recorded on 50 tracks starting from the outermost track and continuing inward on the magnetic disk D.

An operation unit 14 is connected to the system control circuit 10, to operate the still video device. Note, a record mode, a photographing date, and so on, which are indicated by ID codes related to an image recorded on the magnetic disk D, are inputted through the operation unit 14. When the operation unit 14 is operated to select a record mode in which image signals of the HDTV mode are changed to image signals of the standard television mode to be recorded on a magnetic disk, information indicating that the image signals are recorded on a recording track of the magnetic disk according to the record mode is added to a user's area of the ID code. This information is decoded when reproducing the image signals.

High quality images signal obtained through a still video camera (not shown) or an outer input terminal (not shown) are inputted to the still video device as R-Y and B-Y differential color signals and a luminance signal (Y+S) including a synchronizing signal S. This synchronizing signal S is a composite synchronizing signal including a horizontal synchronizing signal, a vertical synchronizing signal and an equalizing synchronizing signal.

Note, in this case, the inputted image signals have been generated in accordance with the HDTV mode. Further note, in the drawing, the reference "H" added to the luminance signal and the differential color signals refers to high quality.

A synchronizing signal S included in the luminance signal (Y+S) is separated from the luminance signal (Y+S) by a synchronizing signal separating circuit 21, and transmitted to a memory control circuit 22 and the control circuit 10. The memory control circuit 22 control s A/D converters 23, 24, 25, a Y memory 26, an R-Y memory 27 and a B-Y memory 28, based on the synchronizing signal S. The memory control circuit 22 controls D/A converters 31, 32, 33, the Y memory 26, the R-Y memory 27 and the B-Y memory 28, based on a synchronizing signal outputted from a synchronizing signal generating circuit 34 described later.

The luminance signal (Y+S) including the synchronizing signal is A/D converted by the A/D converter 23, and a luminance signal Y recorded between two horizontal synchronizing signals is stored in the Y memory 26. Similarly, the R-Y differential color signal is A/D converted by the A/D converter 24 and stored in the R-Y memory 27, and the B-Y differential color signal is A/D converted by the A/D converter 25 and stored in the B-Y memory 28.

The luminance signal Y stored in the Y memory 26, the R-Y differential color signal stored in the R-Y memory 27, and the B-Y differential color signal stored in the B-Y memory 28 are D/A converted by the D/A converters 31, 32 and 33, respectively, which are operated based on a synchronizing signal (a standard clock signal) outputted from a synchronizing signal generating circuit 34. Note, the period of the above-mentioned standard clock signal is half, for example, of that of a standard clock signal used for recording an image signal in the memories 26, 27 and 28. Accordingly, the image signals are read out from each of the memories 26, 27 and 28 at a relatively slow speed, whereby the image signals are time-expanded. The D/A converted luminance signal Y is inputted to the Y record processing circuit 35 and subjected to a process such as an FM-modulation. The D/A converted R–Y and B–Y differential color signals are inputted to a C record processing circuit 36 and subjected to a process such as FM-modulation.

An ID code inputted through the operating unit 14 and the control circuit 10 is subjected to a process such as differential phase shift keying (DPSK) modulation, by an ID record processing circuit 37.

The DPSK-modulated ID code, the FM-modulated luminance signal and differential color signal are superimposed one on the other by an adder 38, and then amplified by the record amplifier 13 and transmitted to the magnetic head 11. The and the ID code, the luminance signal and the differential color signal are then recorded on a predetermined track of the magnetic disk D through the magnetic head 11. The signals recorded on the magnetic disk D have been time-expanded in comparison with signals inputted to the still video device as described above.

In this embodiment, image signals inputted to the still video device are subsampled and stored in the memories 26, 27 and 28. Then, the image signals are read from the memories 26, 27 and 28 with time-expansion, and recorded on the magnetic disk D. This operation is described with reference to FIGS. 2 through 5. Note, in this embodiment, the inputted image signals are recorded on the magnetic disk D in the frame recording mode, and the number of scanning lines and the line frequency of the inputted image signal are determined according to the HDTV mode (the high vision mode) and so on.

Figure 2:
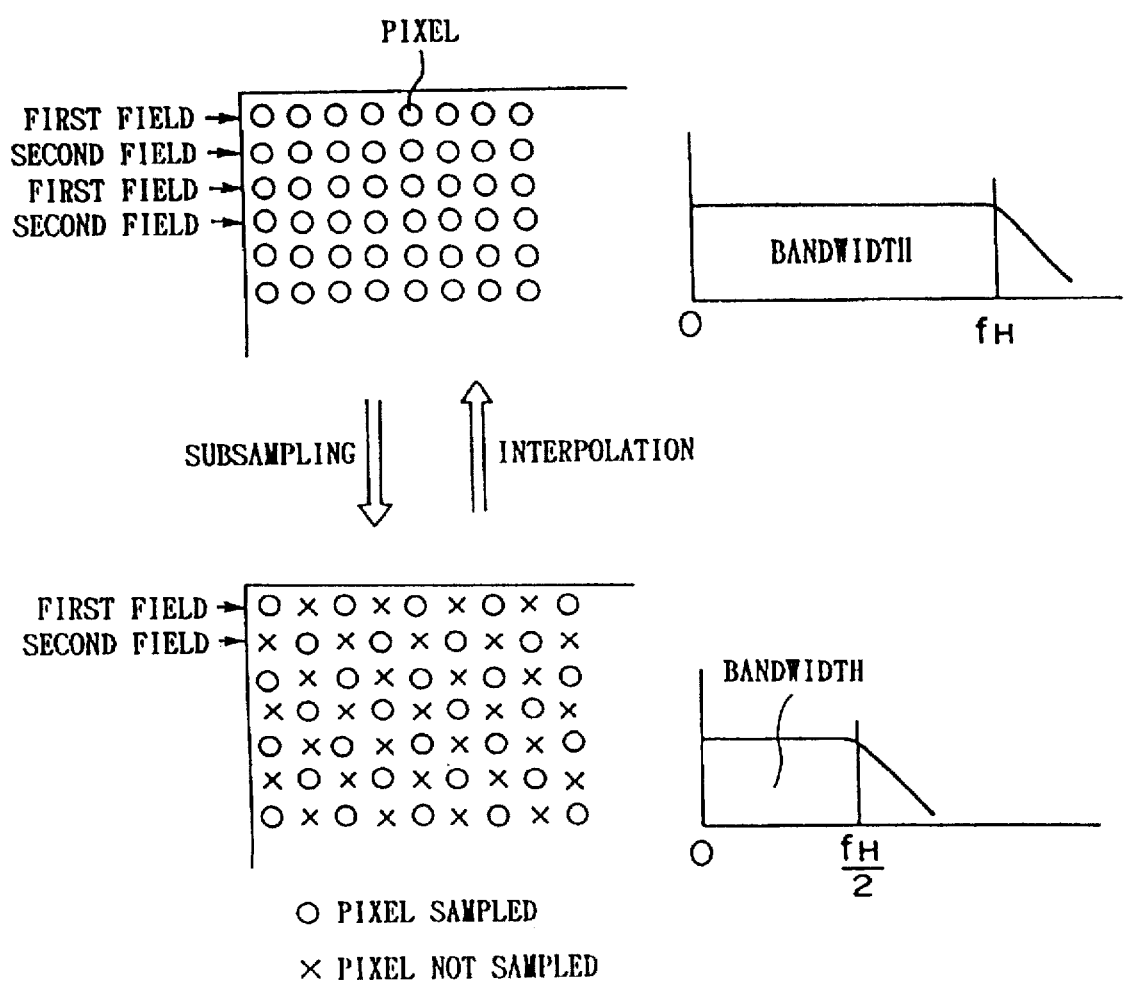
FIG. 2 is a diagram showing a relationship between subsampling and interpolation.

FIG. 2 shows the relationship between subsampling and interpolation. In this drawing, the bandwidth of the inputted image signals is $f_H$, and the image signals are stored in memories 26, 27 and 28 after half of the pixels of the image signals have been subsampled. Further, when reproducing the image signals, the image signals are interpolated by a known method, so that the subsampled pixels substantially reappear, and thus, image signals having almost the same quality as the inputted image signals are obtained.

In FIG. 2, with regard to the pixels of the first field, the leftmost pixel of the frame is sampled and the pixel positioned next to the leftmost pixel is thinned out. The same operation is applied successively such that the sampling is carried out for every other pixel. Conversely, regarding pixels of the second fields the leftmost pixel of the frame is thinned out and the pixel positioned next to the leftmost pixel is sampled. Again, the same operation is applied successively such that the sampling is carried out for every other pixel. Accordingly, pixels of the inputted image signals are subsampled uniformly over the entire frame.

Figure 3:
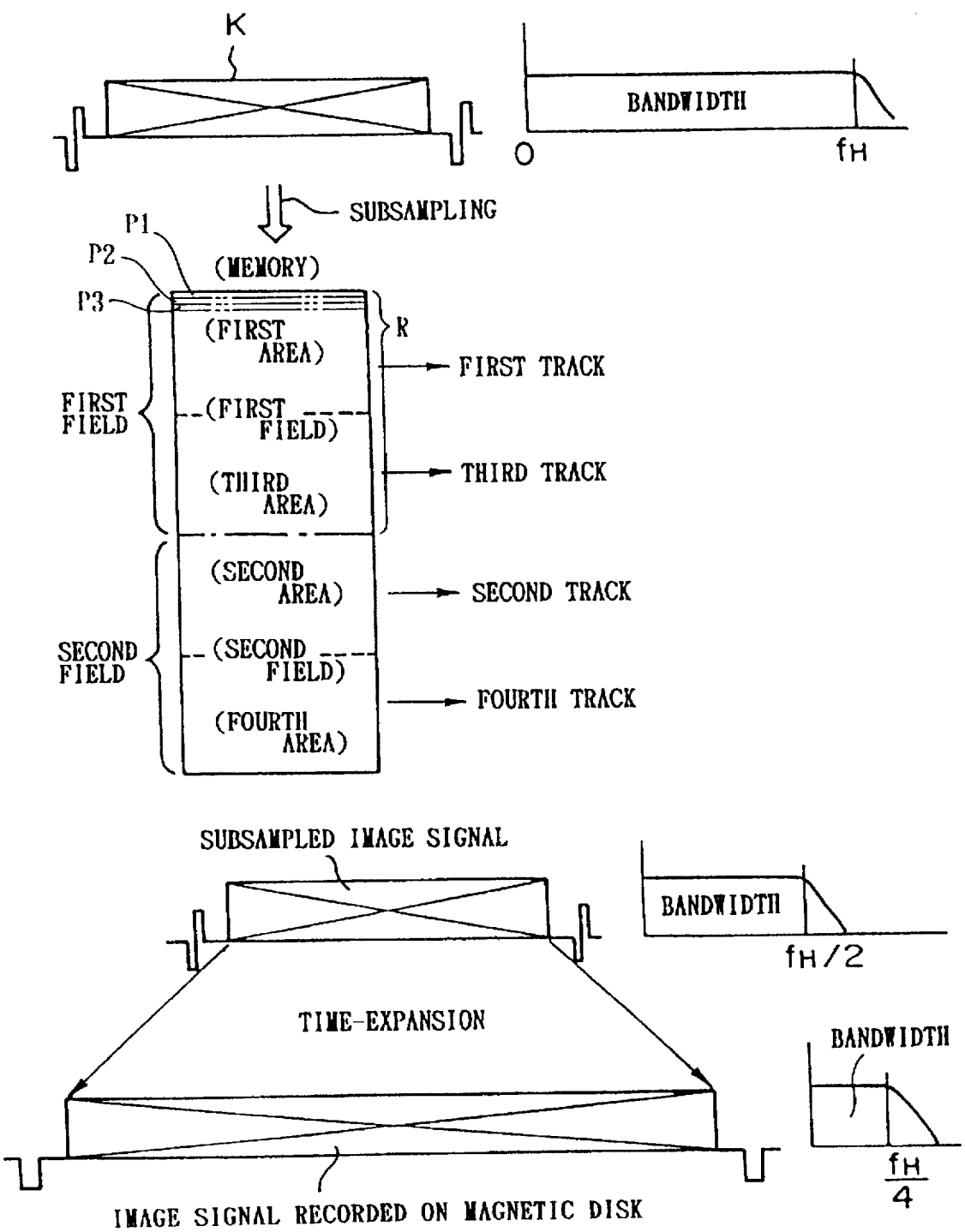
FIG. 3 is a diagram showing a relationship among inputted image signals, image signals recorded in memories, and image signals recorded on a magnetic disk.

FIG. 3 shows the relationship between inputted image signals, image signals recorded in the memories, and image signals recorded on the magnetic disk D. Inputted image signal K corresponds to one horizontal scanning line. In the memory, the image signal K is recorded in each of recording portions P1, P2, P3 . . . which extend in horizontal directions in the drawing, and number (R) of recording portions P1, P2, P3 . . . corresponds to the number of scanning lines of one field of the high vision mode. Namely, image signals of one frame are stored sequentially from the first address in the memory, and thus, the memory addresses in which the image signals are stored correspond to positions of the display surface on which the image is indicated. The operation of storing the image signal into the memory is controlled by the memory control circuit 22.

In FIG. 3, although the bandwidth of the inputted image signal K is $f_H$, image signals stored in the memories are subsampled, so that the bandwidth of the image signals becomes $f_H/2$. Image signals of a first field and image signals of a second field are divided and stored in a first recording area through a fourth recording area of memories 26, 27 and 28, respectively. Namely, image signals corresponding to an upper frame of the first field are stored in the first recording area of the memories; image signals corresponding to a lower frame of the first field are stored in the third recording area of the memories; image signals corresponding to an upper frame of the second field are stored in the second recording area of the memories; and image signals corresponding to a lower frame of the second field are stored in the fourth recording area of the memories. The image signals stored in the first through fourth recording areas are recorded on the first through fourth tracks of the magnetic disk D.

The image signals stored in the memories are time-expanded two times when recorded on the magnetic disk D, whereby the bandwidth of the image signal becomes $f_H/4$. Therefore, even if the inputted image signals have been formed according to the HDTV mode, the image signals can be recorded on the magnetic disk D by the still video device while maintaining the high quality thereof.

Figure 4:
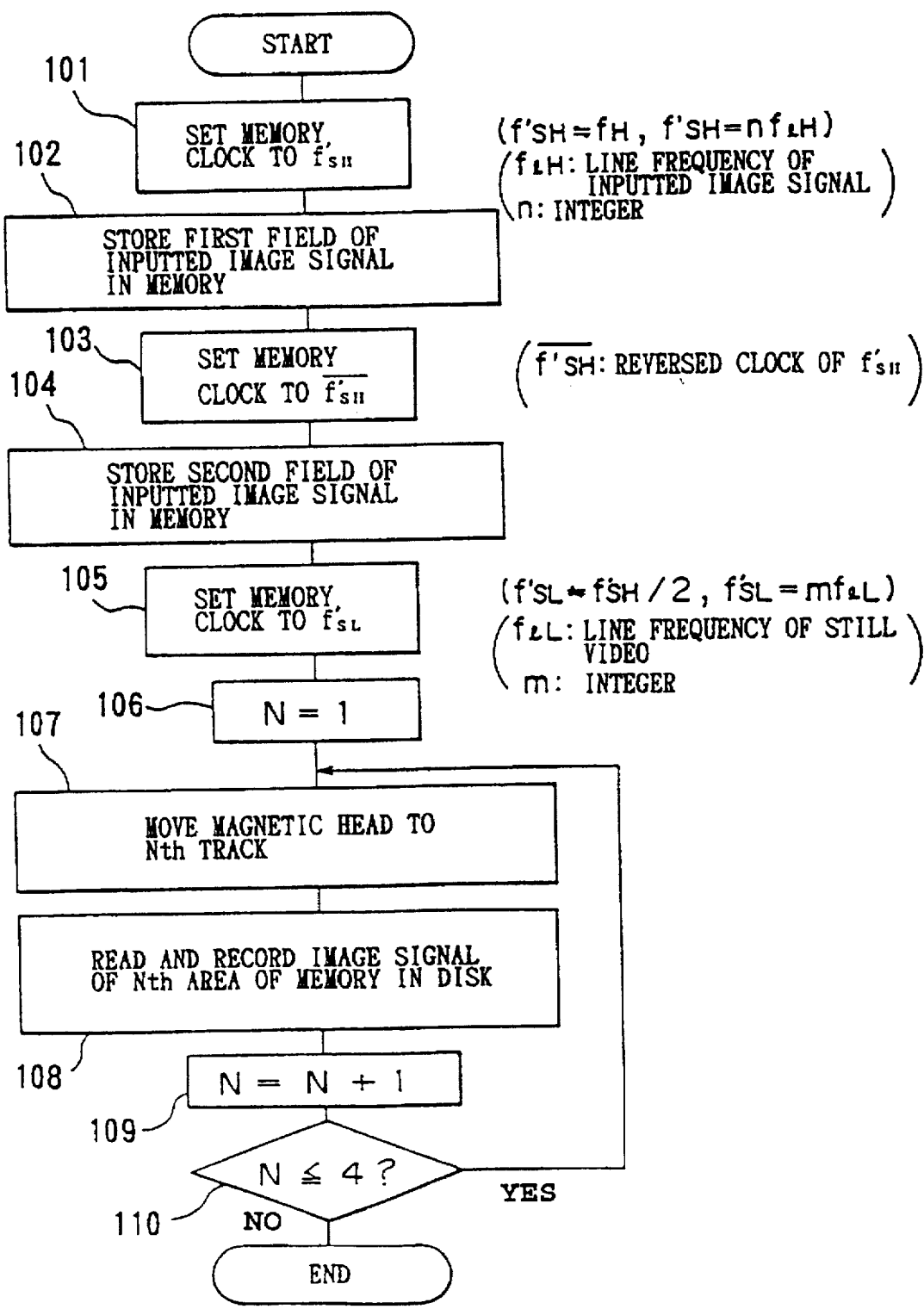
FIG. 4 is a flowchart of a program by which inputted image signals of each field are divided into two parts and subsampled to be recorded on the magnetic disk.
Figure 5:
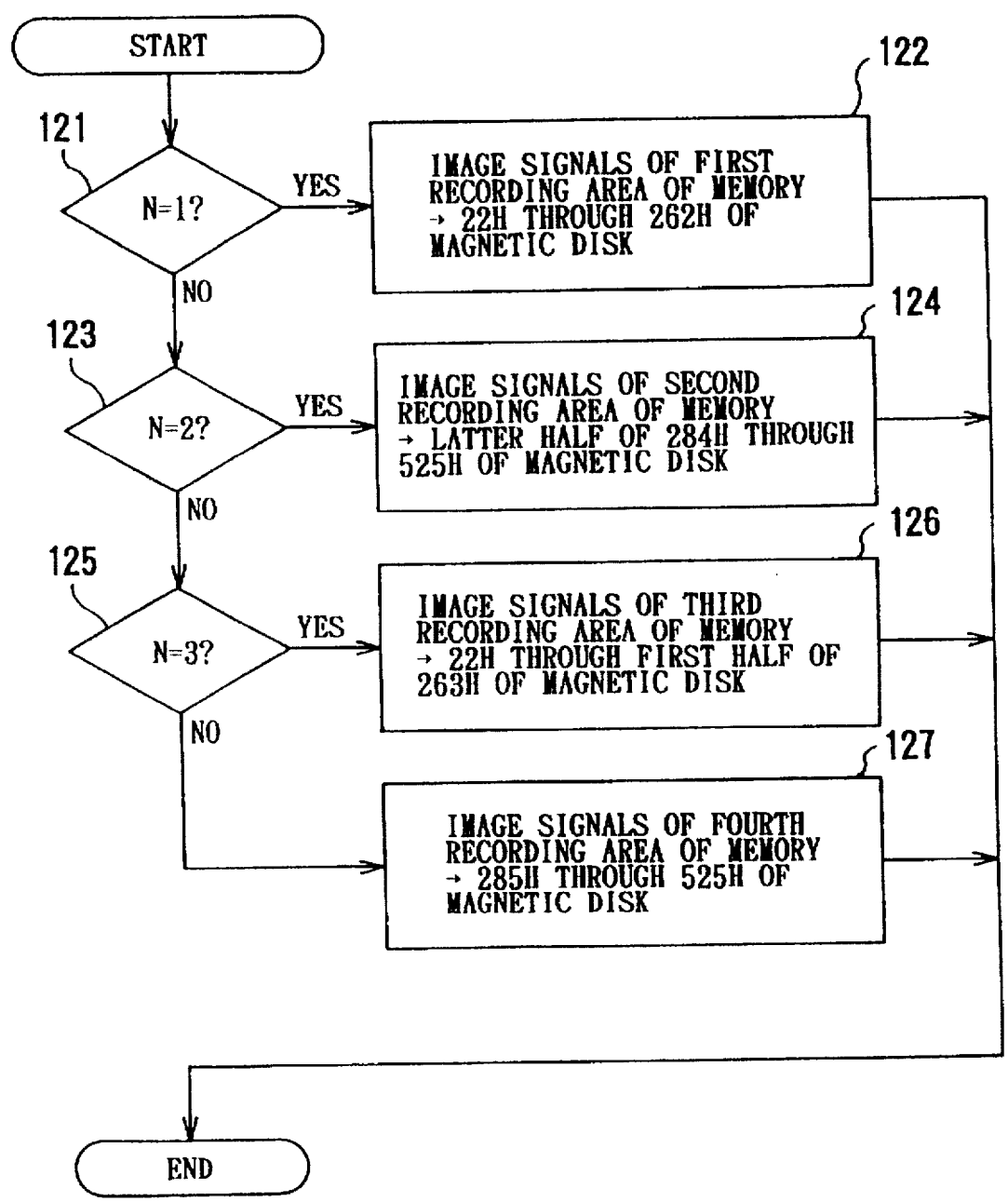
FIG. 5 is a flowchart of a program of a disk recording routine in a first embodiment.

FIGS. 4 and 5 show flowcharts of programs by which inputted image signals of one frame are divided into two parts and subsampled to be recorded on the magnetic disk D, as shown in FIG. 3.

In Step 101, the frequency of a memory clock is set to $f'_{SH}$, which is approximately equal to the bandwidth $f_H$ of the inputted image signals. This memory clock speed is equal to an integer times the horizontal line frequency of the inputted image signals, and is generated based on the standard clock signals outputted from the synchronizing signal generating circuit 34. The reason why the frequency of the memory clock is set to an integer times the horizontal line frequency of the inputted image signals is that the clock signal is raised at the left end of the frame. Accordingly, regarding the first field, odd numbered pixels counted from the left end of the frame are sampled, as described later. In Step 102, the first field of inputted image signals is A/D converted based on the memory clock set in Step 101, and stored in the memories 26, 27 and 28.

Then, in Step 103, the memory clock is inverted (phase reversed), so that the rising and falling edges of the memory clock shifted by exactly 180° (or by a half period) in relation to the memory clock set in Step 101 are generated. In Step 104, based on the memory clock set in Step 104, the second field of the inputted image signals is A/D converted to be stored in memories 26, 27 and 28, similarly to Step 102.

Figure 6:
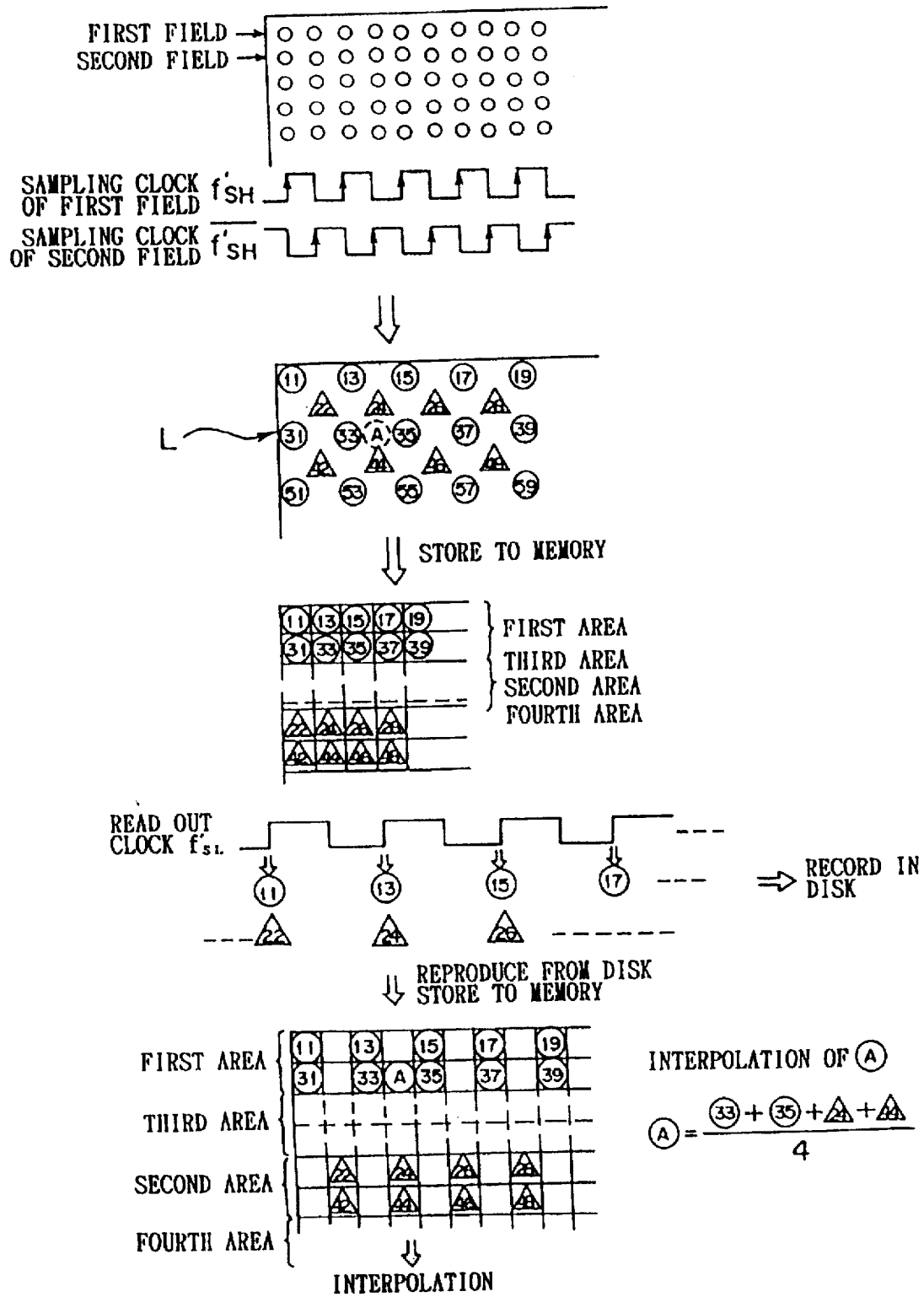
FIG. 6 is a diagram showing an operation in which image signals recorded in the magnetic disk by subsampling are read from the magnetic disk.

With reference to FIG. 6, an operation in which the image signals are stored in the memories in Steps 102 and 104 is described below.

A sampling of pixels of the image signals is carried out by raising the clock signal. Therefore, as shown by reference L, in the first field, the odd numbered pixels counted from the left end of the drawing are sampled, and in the second field the even numbered pixels counted from the left end of the drawing are sampled. The pixels of the first field sampled by this operation are stored in the first and third recording areas of the memories, and the pixels of the second field sampled by this operation are stored in the second and fourth recording areas.

In Step 105, the memory clock is set to the frequency $f'_{SL}$. This frequency $f'_{SL}$ is half of the frequency $f_{SL}$, which is provided for storing the inputted image signals into the memories, and is an integer times the line frequency of the still video. The reason why the frequency of the memory clock is set to an integer times the line frequency of the still video is so that, on the magnetic disk, the relative positions of the synchronizing signal and the image signal are exactly aligned with each other.

In Step 106, a counter N is set to "1", in Step 107 the magnetic head 11 is moved to the Nth track, and in Step 108 a disk recording routine (FIG. 5) is executed, so that the image signals stored in the Nth recording areas of the memories 26, 27 and 28 are read out at the timing of the frequency $f'_{SL}$, and recorded on the magnetic disk D. This disk recording routine is described later.

In Step 109, the counter N is incremented by "1", and in Step 110 it is determined whether the counter N is less than or equal to "4". When the counter is less than or equal to "4", since the reading out of all of the image signals stored in all of the recording areas of the memories 26, 27 and 28 has not been completed, the process after Step 107 is again executed. Conversely, when the counter N is higher than "4", the image signals stored in all of the recording areas of the memories 26, 27 and 28 have been read out, and therefore, the program is ended.

One frame is divided into two partial frames by a straight line parallel to the horizontal scanning lines, and thus partial image signals corresponding to each of the partial frames are defined. In Step 108, the partial image signals are recorded on each track of the magnetic disk D. This recording operation is described below with reference to FIGS. 7 through 9.

These drawings show an example in which one frame recorded in accordance with the high vision mode is divided into two parts, i.e., an upper partial (or half) frame and a lower partial (or half) frame, and then recorded on the magnetic disk D in accordance with the NTSC mode.

Figure 7:
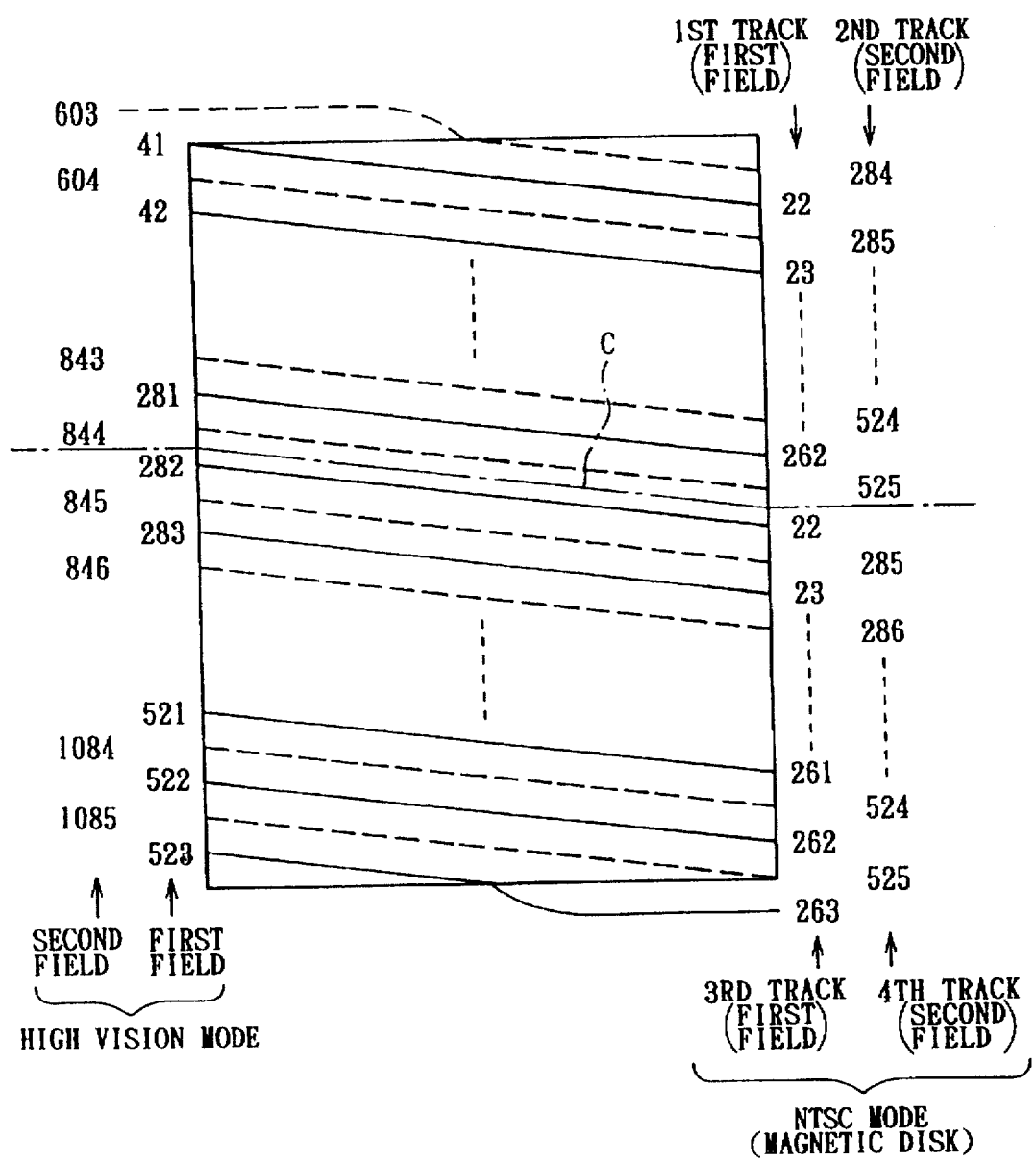
FIG. 7 is a diagram showing a relationship, in the first embodiment, between horizontal scanning lines recorded on the magnetic disk and horizontal scanning lines in a high vision mode.

As shown in FIG. 7, the frame is divided into the upper half frame and the lower half frame by a straight line C which is parallel to the horizontal scanning line and is positioned approximately at the center of one frame. Namely, the straight line C is slightly inclined by the same angle as the horizontal scanning lines.

Regarding the upper half frame, image signals of the first field of the high vision mode are recorded on a part of the magnetic disk D corresponding to 22H ("H" indicates a horizontal scanning period) through 262H, in accordance with the NTSC mode, and image signals of the second field of the high vision mode are recorded on a part of the magnetic disk D corresponding to a mid portion of 284H through 525H, in accordance with the NTSC mode. The image signals of the first field of the high vision mode are recorded on a first track of the magnetic disk, and the image signals of the second field of the high vision mode are recorded on a second track of the magnetic disk.

Regarding the lower half frame, image signals of the first field of the high vision mode are recorded on a part of the magnetic disk D corresponding to 22H through a mid portion of 263H, in accordance with the NTSC mode, and image signals of the second field of the high vision mode are recorded on a part of the magnetic disk D corresponding to 285H through 525H, in accordance with the NTSC mode. The image signals of the first field of the high vision mode are recorded on a third track of the magnetic disk, and the image signals of the second field of the high vision mode are recorded on a fourth track of the magnetic disk.

Thus, the lowermost horizontal scanning line of the upper half frame is recorded in 525H of the second tracks and this horizontal scanning line is not divided into two parts. Similarly, the uppermost horizontal scanning line of the lower half frame is recorded in 22H of the third track, and this horizontal scanning line is not divided into two parts.

Comparing the horizontal scanning lines in the high vision mode with the horizontal scanning lines recorded on the magnetic disk according to the first embodiments as understood from FIG. 7, regarding the first field of the high vision mode, image signals corresponding to 41H through 523H are recorded on the magnetic disk, and regarding the second field of the high vision mode, image signals corresponding to 603H through 1085H are also recorded on the magnetic disk. The straight line C dividing the frame into the upper half frame and the lower half frame is positioned between 282H of the first field and 844H of the second field in the high vision mode.

Namely, image signals corresponding to 41H through 281H of the high vision mode are recorded in a portion corresponding to 22H through 262H of the first track of the magnetic disk, and image signals corresponding to 282H through 523H of the high vision are recorded in a portion corresponding to 22H through 263H of the third track of the magnetic disk. Image signals corresponding to 603H through 844H of the high vision mode are recorded in a portion corresponding to 284H through 525H of the second track of the magnetic disk, and image signals corresponding to 845H through 1085H of the high vision are recorded in a portion corresponding to 285H through 525H of the fourth track of the magnetic disk.

Figure 8:
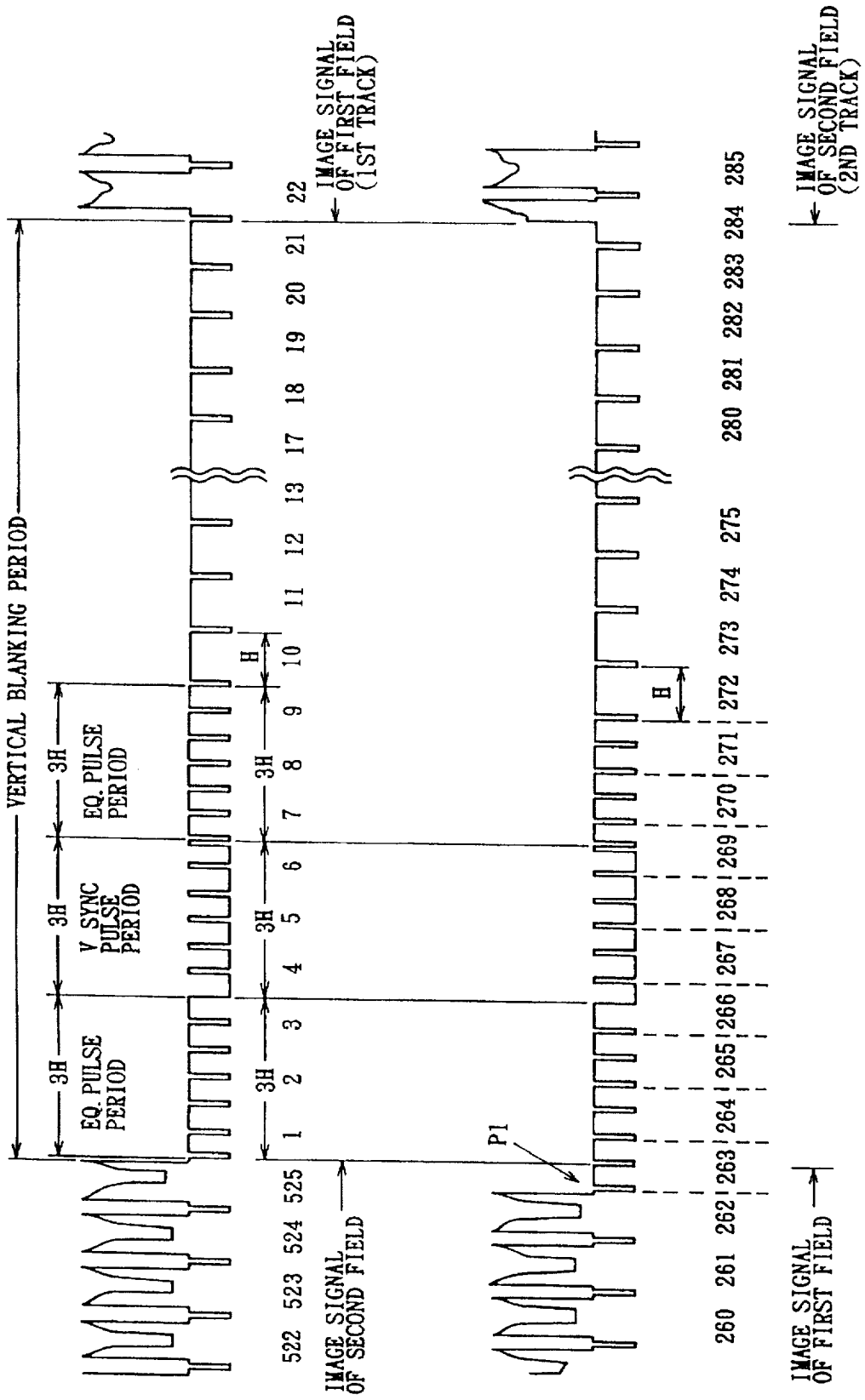
FIG. 8 is a diagram showing image signals corresponding to an upper half frame, in the first embodiment.

FIG. 8 shows signals which are recorded on the first and second tracks of the magnetic disk D and correspond to the upper half frame. As shown in this drawing, the image of the first field is recorded from 22H through 262H, and no image signal is recorded in the first half (P1) of 263H, in which an image signal is recorded in a conventional device. Image signals of the second field are recorded from a mid portion of 284H through 525H. Since the image of the second field is started at the uppermost part of the frame, the uppermost horizontal scanning line of the second field is not connected to the other horizontal scanning line recorded on the other track. Therefore, although the horizontal scanning lines are started at a mid portion of 284H, this does not cause noise in the frame.

Figure 9:
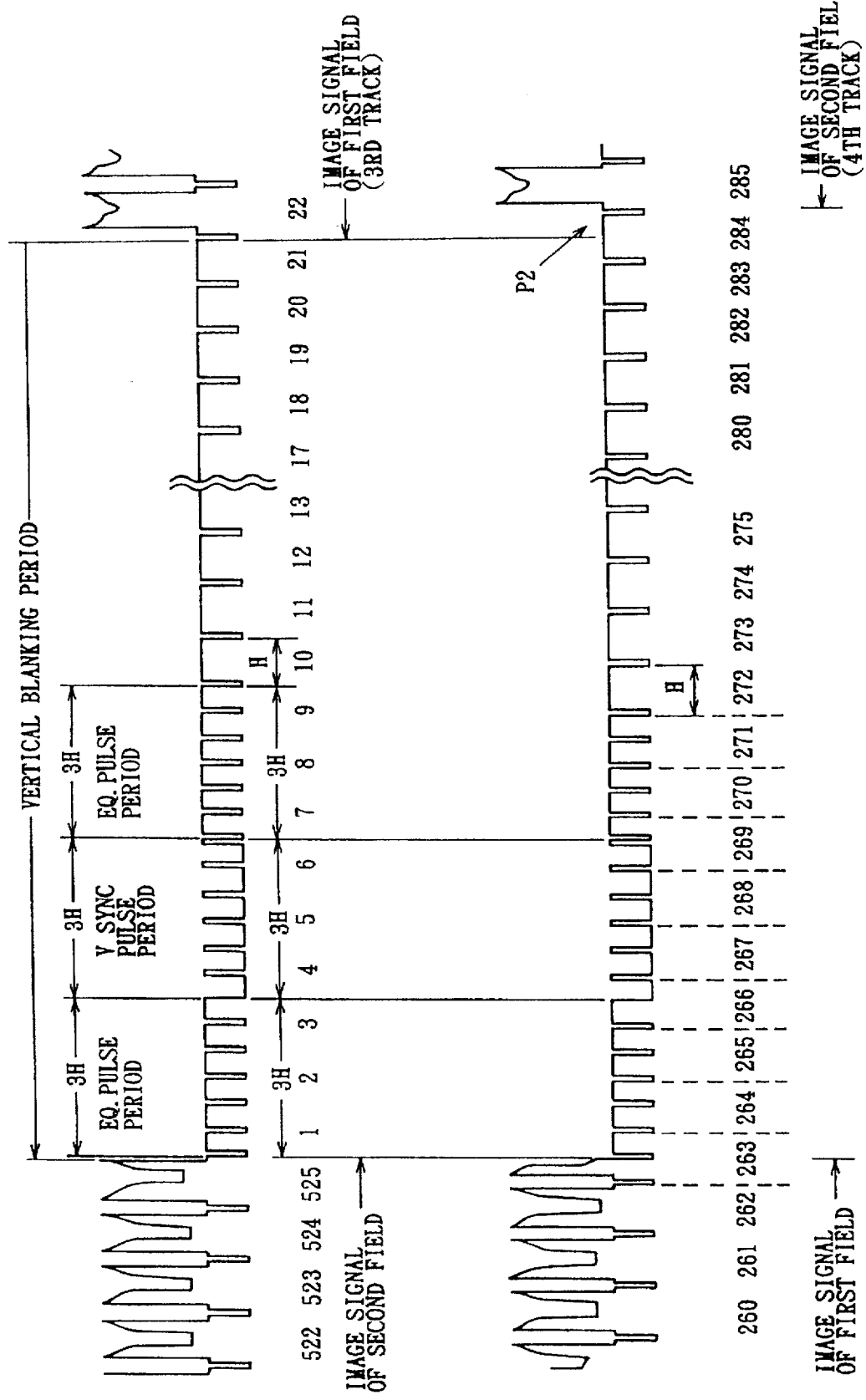
FIG. 9 is a diagram showing image signals corresponding to a lower half frame, in the first embodiment.

FIG. 9 shows signals which are recorded on the third and fourth tracks of the magnetic disk D and correspond to the lower half frame. As shown in this drawing, the image of the first field is recorded from 22H through a mid portion of 263H, and image signals of the second field are recorded from 285H through 525H. No image signal is recorded in the latter half (P2) of 284H, in which an image signal is recorded in a conventional device. Since the image of the first field is ended at the lowermost part of the frame, the lowermost horizontal scanning line of the first field is not connected to the other horizontal scanning line recorded on the other track. Therefore, although the horizontal scanning lines are ended at a mid point of 263H, this does not cause noise in the frame.

With reference to FIG. 52 the contents of the disk recording routine executed in Step 108 of the program shown in FIG. 4 are described.

In Step 121, it is determined whether counter N is "1". When the counter N is "1", i.e., when image signals are recorded on the first track, in Step 122, image signals stored in the first recording areas of the memories are read out, and are recorded on the first track of the magnetic disk as image signals of horizontal scanning lines from 22H through 262H.

When counter N is not "1", it is determined in Step 123 whether counter N is "2". When counter N is "2", Step 124 is executed, and thus, image signals stored in the second recording areas of the memories are read out, and are recorded on the second track of the magnetic disk as image signals of horizontal scanning lines from the latter half of 284H through 525H.

When counter N is not "2", it is determined in Step 125 whether counter N is "3". When the counter N is "3", Step 126 is executed. Namely, image signals stored in the third recording areas of the memories are read out, and are recorded on the third track of the magnetic disk as image signals of horizontal scanning lines from 22H through the first half of 263H. When counter N is not "3", i.e., when counter N is "4", Step 127 is executed, and thus, image signals stored in the fourth recording areas of the memories are read out, and are recorded on the fourth track of the magnetic disk as image signals of horizontal scanning lines from 285H through 525H.

In the operation of recording the image signals of horizontal scanning lines in Steps 122, 124, 126 and 127, the memory control circuit 22 designates an address corresponding to the scanning line specified in each of the Steps, reads out data stored in the address and sequentially D/A converts the data to obtain analog image signals, which are recorded through the record processing circuits 35 and 36, the adder 38, the recording amplifier 13 and the magnetic head 11, on a track of the magnetic disk in a predetermined format.

Thus, the image signals are recorded on predetermined tracks of the magnetic disk in the form as shown in FIGS. 8 and 9.

Figure 10:
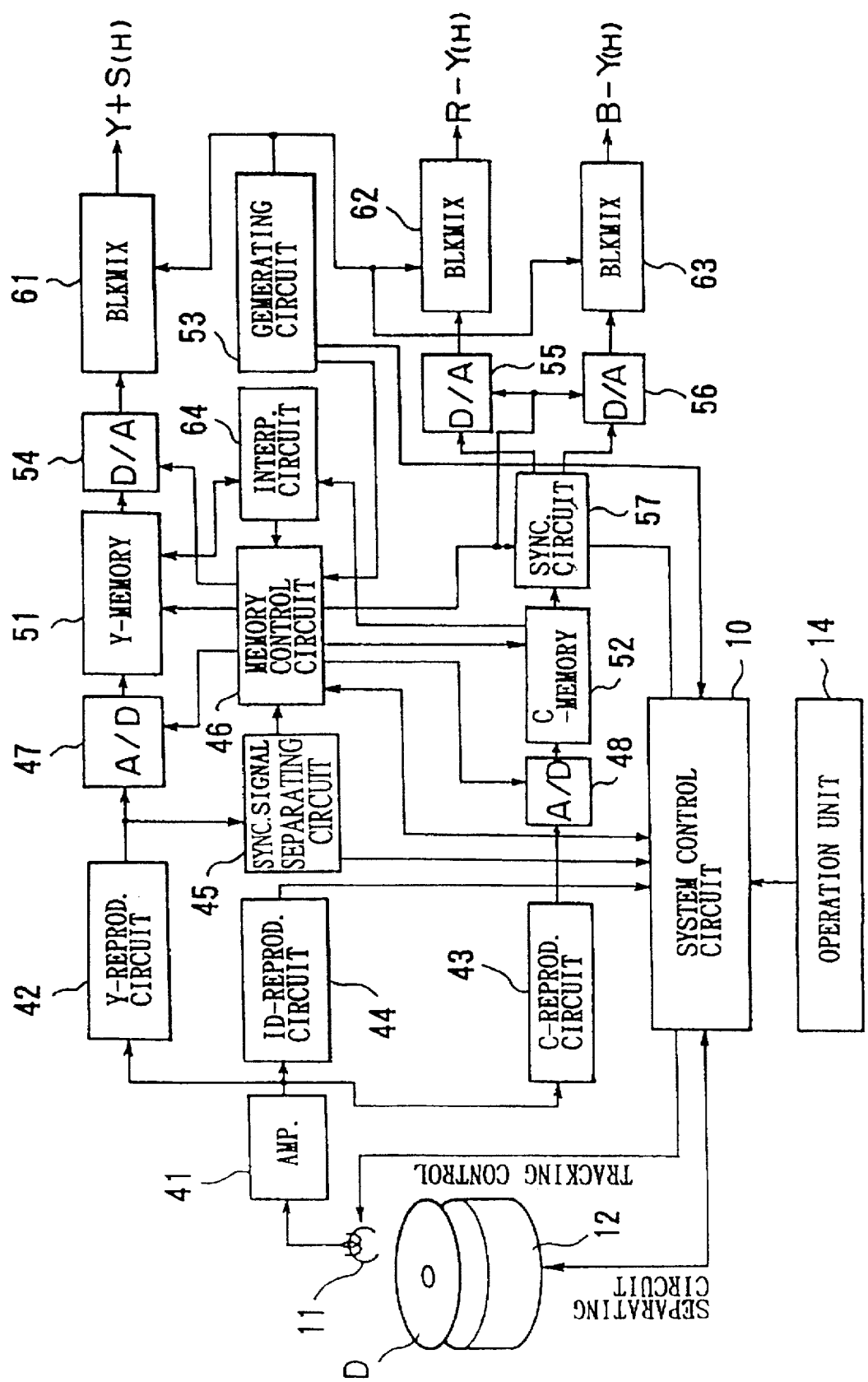
FIG. 10 is a block diagram showing a reproducing system of the still video device.

FIG. 10 shows a block diagram of a reproducing system of the still video device.

The system control circuit 10, the magnetic head 11, the spindle motor 12 and the operation unit 14 are also included in the recording system shown in FIG. 1; i.e.; are provided for the recording system and the reproducing system.

The magnetic head 11 is positioned at a predetermined track of the magnetic disk D, so that ID codes and image signals recorded in the track are reproduced. A reproducing amplifier 41 reads the image signals and the ID codes recorded on the magnetic disk D, and outputs the same to a Y-reproduction process circuit 42, a C-reproduction process circuit 43, and an ID-reproduction process circuit 44. The Y-reproduction process circuit 42 frequency-demodulates and outputs luminance signals (Y+S) including synchronizing signals. The C-reproduction process circuit 43 frequency-demodulates and outputs R-Y and B-Y differential color signals. The ID-reproduction process circuit 44 DPSK-demodulates and outputs the ID codes.

A synchronizing signal S included in the luminance signal (Y+S) is separated from the luminance signal (Y+S) by a synchronizing signal separating circuit 45, and transmitted to a memory control circuit 46 and the system control circuit 10. The memory control circuit 46 controls A/D converters 47, 48, a Y-memory 51 and a C-memory 52, based on the synchronizing signal S. Furthers the memory control circuit 46 controls D/A converters 54, 55, 56, the Y-memory 51 and the C-memory 52, based on a synchronizing signal outputted from a synchronizing signal generating circuit 53 described later.

The luminance signals (Y+S) including the synchronizing signals are A/D converted by the A/D converter 47, and the luminance signal Y recorded between two horizontal synchronizing signals is stored in the Y-memory 51 under the control of the memory control circuit 46. The luminance signal Y stored in the Y-memory 51 is D/A converted by the D/A converter 54, based on a synchronizing signal (a high standard clock signal according to the HDTV mode) outputted from the synchronizing signal generating circuit 53.

Similarly, the R-Y and the B-Y differential color signals are A/D converted by the A/D converter 48, and stored in the C-memory 52. The R-Y and the B-Y differential color signals are alternately outputted from the C-memory 52, based on the standard clock signal, and the R-Y and the B-Y differential color signal formed on the same horizontal scanning line as each other are simultaneously outputted from a synchronization circuit 57, by an operation of the memory control circuit 46. These signals outputted from the synchronization circuit 57 are inputted to D/A converters 55 and 56 and are D/A converted.

The standard clock signal used for reading image signals from the Y-memory 51 and the C-memory 52 has a frequency value which is twice, for example, that of the standard clock signal used for recording image signals to the Y-memory 51 and the C-memory 52. Therefore, the image signals are read from the memories 51 and 52 at a relatively high speed, whereby the image signals are time-compressed.

Blanking sync mix circuits 61, 62 and 63 are provided for setting a predetermined portion in front of the R-Y and the B-Y differential color signal to a zero level, and superimposing a synchronizing signal on that portion. Accordingly, by an operation of the blanking sync mix circuits 61, 62 and 63, a clear synchronizing signal (i.e., S(H)) which conforms with a system such as the HDTV mode is supplemented at a portion in front of these differential color signals. Each of the signals (Y+S(H)), (R-Y(H)) and (B-Y(H)) outputted from the blanking sync mix circuits 61, 62 and 63 are inputted to a display device, not shown.

An interpolation process circuit 64 is provided for carrying out an interpolation based on luminance and color-difference of pixels positioned around a pixel which are to reappear, to obtain the luminance and color-difference of the reappearing pixel.

This interpolation is described below with reference to FIG. 6. Pixels obtained by this interpolation correspond to pixels which have been thinned out when the image signals are sampled. In the image signals shown by reference L, an interpolated pixel is shown by reference A encircled by a broken line. The value of the pixel (A) is obtained by taking the arithmetic mean of pixels positioned around the pixel A and shown by references 33, 35, 24 and 44. The pixels (33, 35) positioned at the left and the right sides of the pixel (A) belong to the same horizontal scanning line, and the pixels (24, 44) positioned above and below the pixel (A) belong to horizontal scanning lines positioned above and below the horizontal scanning line of the pixel (A), respectively. Namely, the pixels (24, 44) are included in a field that is different from a field in which the pixels (33, 35) are included.

Thus, since the thinned out pixels are approximated by interpolation, when the image signals recorded on the magnetic disk are reproduced, the image obtained has substantially the same resolution as the inputted image signals.

The ID code stored on the magnetic disk D is subjected to a process such as a DPSK-demodulation in the ID-reproduction process circuit 44, so that the ID code is decoded by the system control circuit 10.

Figure 11:
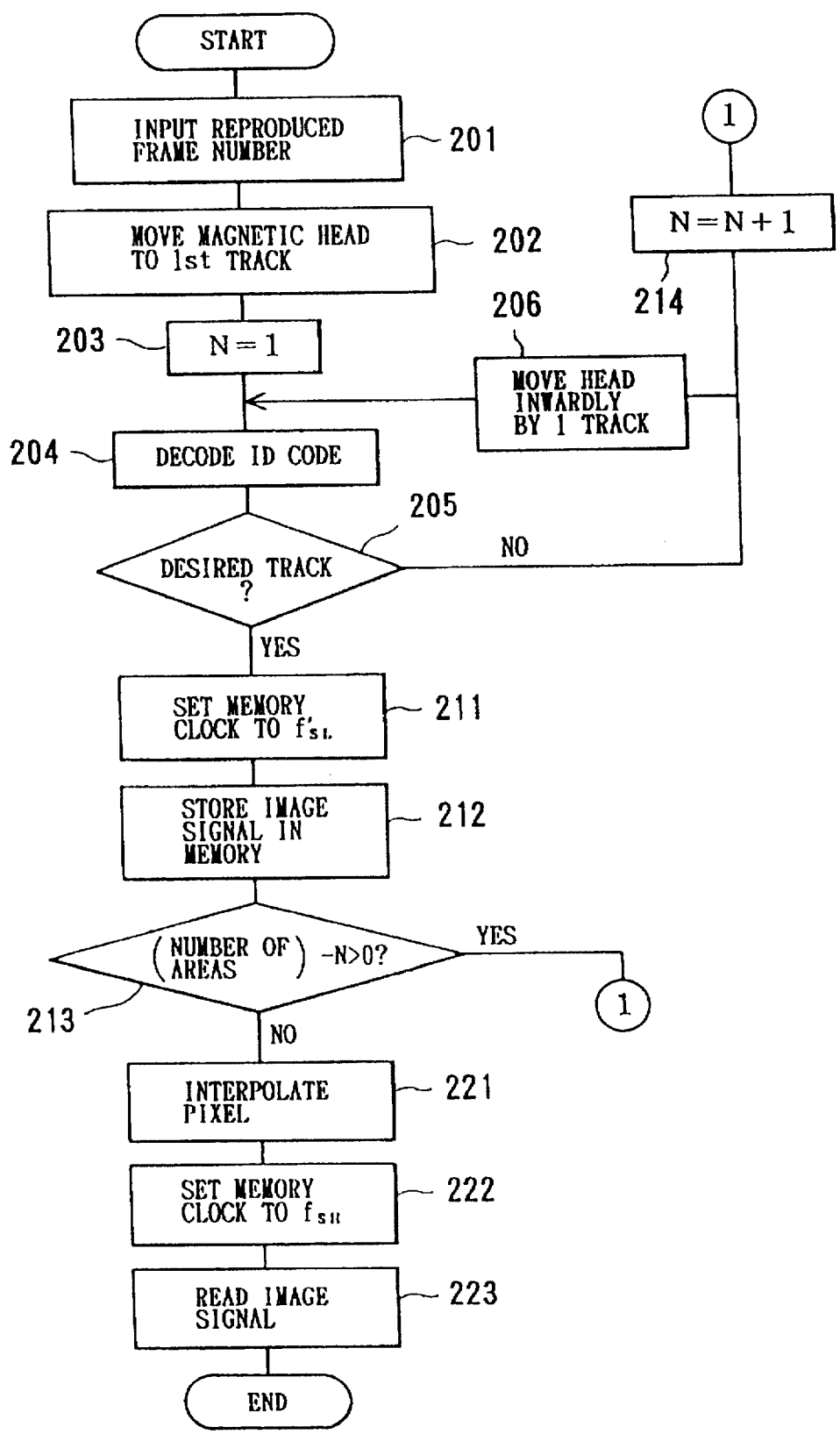
FIG. 11 is a flowchart of a program by which image signals recorded on the magnetic disk are reproduced.

FIG. 11 shows a flowchart of a program by which image signals which are divided with respect to a frame and recorded with time-expansion on a magnetic disk D are reproduced.

In Step 201, the reproducing frame number, i.e., the number of the frame to be reproduced, is inputted though the operation unit 14. In Step 202, the magnetic head 11 is moved to and positioned at the first track, i.e., the outermost track of the magnetic disk D, and in Step 203 the counter N is set to "1".

In Step 204, the ID codes of the first track are decoded, and in Step 205, based on the contents of the ID codes, it is determined whether the track corresponds to the desired image selected in Step 201. When this track does not correspond to the desired image, the magnetic head 11 is moved inwardly by one track in Step 206. Then, Steps 204 and 205 are repeatedly carried out until the desired track is found.

When the track storing the desired image is found, the process goes from Step 205 to Step 211, in which the memory clock is set to the frequency $f'_{SL}$. This frequency $f'_{SL}$ is half of the bandwidth $f_H$ of the image signal (FIG. 4). In Step 212, based on the memory clock of the frequency $f'_{SL}$, the image signals are A/D converted, and stored in predetermined recording areas of the Y-memory 51 and the C-memory 52. At this time, image signals stored in the first and third recording areas are stored in an odd number row of the memories 51 and 52, and image signals stored in the second and fourth recording areas are stored in an even number row of the memories 51 and 52. As a result, the image signals in the memories 51 and 52 are stored, as shown in the bottom part of FIG. 5, in such a manner that pixels belonging to the first and third recording areas are stored in an odd number row counted from the left end of the frame, and the pixels belonging to the second and fourth recording areas are stored in an even number row counted from the left end of the frame.

In Step 213, it is determined whether the difference between the number of the recording areas of the memory (four in this embodiment; see FIG. 3) and counter N is larger than "0". When the number of the recording areas is larger than the counter N, since all the image signals have not yet been stored in the memories 51 and 52, a process by which the next image signal is read from the magnetic disk D is carried out. Namely, in Step 214, counter N is incremented by "1", and then, Steps 206, 204, 205, 211 and 212 are again carried out, so that the next image signal is stored in the memories 51 and 52, similarly to the operation described above.

When it is determined in Step 213 that the number of recording areas is less than or equal to the counter N, since the image signals of one frame have been completely stored in the memories 51 and 52, the processes following Step 221 are carried out, and thus, the image is indicated by the display device. First, in Step 21, pixels thinned out from the memories are interpolated from pixels positioned around the thinned out pixel (see FIG. 6). In Step 222, the memory clock is set to the frequency $f_{SH}$. This frequency $f_{SH}$ is twice the frequency $f'_{SH}$ with which the inputted image signals are subsampled, i.e., $f_{SH}=2f'_{SH}$. Then, in Step 223, the image signals stored in the memories 51 and 52 are sequentially read and outputted to the display device.

As described above, according to the still video device of the first embodiment, since one frame is divided into two half frames by a straight line parallel to the horizontal scanning lines, the horizontal scanning line at the center of the frame is not divided into two parts. Therefore, when the image signals of the half frames are reproduced and combined with each other, a connecting portion does not occur on the horizontal scanning line, and thus, noise does not occur at the center of the frame.

FIGS. 12 through 15 show a second embodiment of the present invention. These drawings show also an example in which one frame recorded in accordance with the high vision mode is divided into two parts, i.e., an upper partial (or half) frame and a lower partial (or half) frame, and then recorded on the magnetic disk D in accordance with the NTSC mode.

Figure 12:
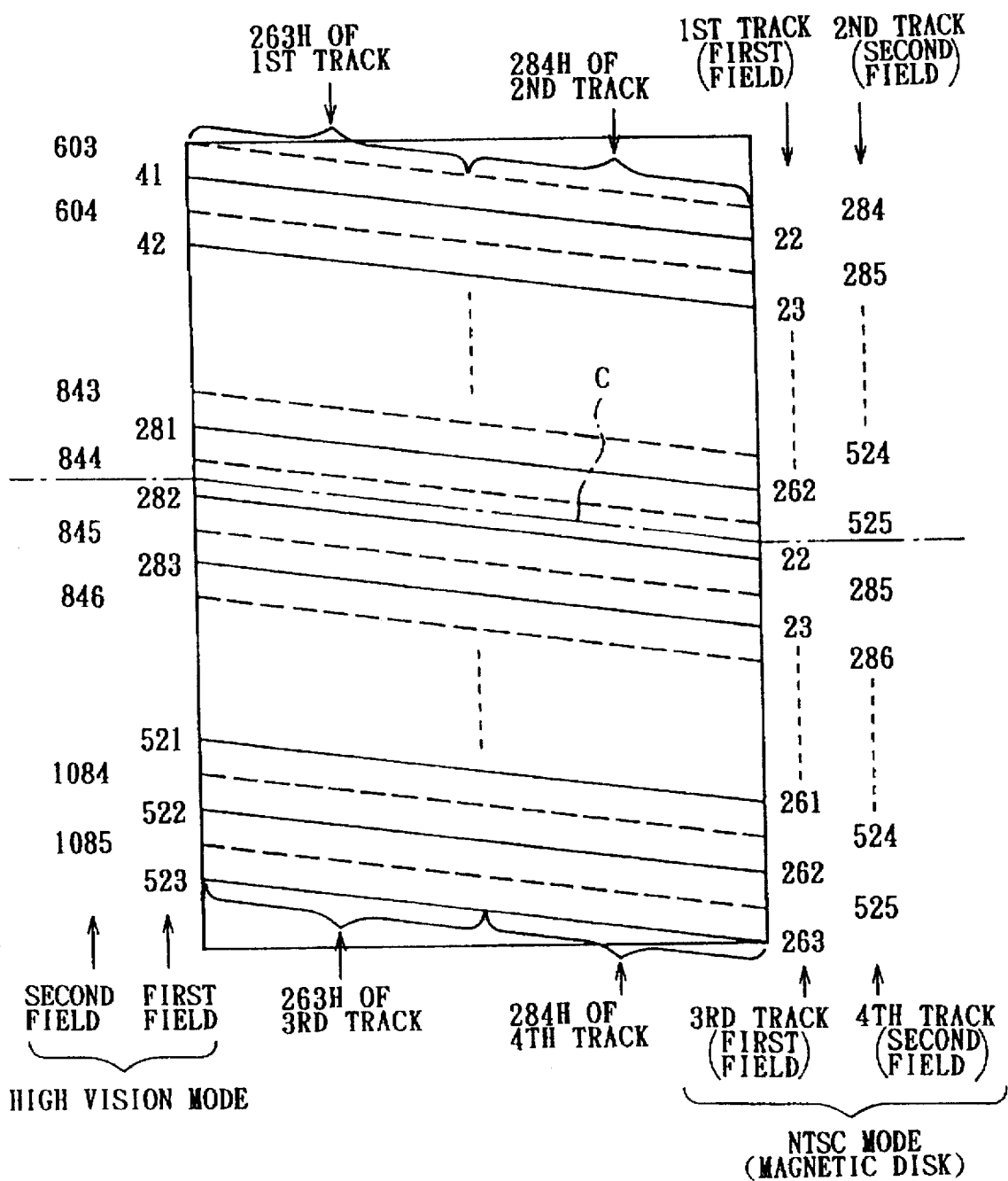
FIG. 12 is a diagram showing a relationship, in a second embodiment, between horizontal scanning lines recorded on the magnetic disk and horizontal scanning lines in the high vision mode.

As shown in FIG. 12, in this embodiment, the frame is divided into the upper half frame and the lower half frame by a straight line C which is parallel to the horizontal scanning line and is positioned approximately at the center of one frame.

Regarding the upper half frame, image signals of the first field of the high vision mode are recorded on a part of the first track of the magnetic disk D corresponding to 22H through 262H, in accordance with the NTSC mode. Image signals of the second field of the high vision mode are recorded on a part of the first track of the magnetic disk D corresponding to the first half of 263H, and on a part of the second track of the magnetic disk D corresponding to the latter half of 284H through 525H, in accordance with the NTSC mode. Namely, the last horizontal scanning line recorded on the first track and the first horizontal scanning line recorded on the second track form one horizontal scanning line positioned at the uppermost portion of the frame.

Regarding the lower half frame, image signals of the first field of the high vision mode are recorded on a part of the third track of the magnetic disk D corresponding to 22H through the first half of 263H, and the latter half of 284H is recorded on the fourth track of the magnetic disk D, in accordance with the NTSC mode. Image signals of the second field of the high vision mode are recorded on a part of the fourth track of the magnetic disk D corresponding to 285H through 525H, in accordance with the NTSC mode. Namely, the last horizontal scanning line recorded on the third track and the first horizontal scanning line recorded on the fourth track form one horizontal scanning line positioned at the lowermost portion of the frame.

Thus, in the upper half frame, the uppermost horizontal scanning line is obtained by connecting horizontal scanning lines recorded on the first and second tracks. In the lower half frame, the lowermost horizontal scanning line is obtained by connecting horizontal scanning lines recorded on the third and fourth tracks. Conversely, at the central portion of the frame, each of the horizontal scanning lines are recorded on individual predetermined tracks, and are not divided.

Comparing the horizontal scanning lines in the high vision mode (the HDTV mode) with the horizontal scanning lines recorded on the magnetic disk according to the second embodiment, as understood from FIG. 12, regarding the first field of the high vision mode, image signals corresponding to 41H through 523H are recorded on the magnetic disk, and regarding the second field of the high vision mode, image signals corresponding to 603H through 1085H are also recorded on the magnetic disk. The straight line C dividing the frame into the upper half frame and the lower half frame is positioned between 282H of the first field and 844H of the second field in the high vision mode.

Namely, image signals corresponding to 41H through 281H of the high vision mode are recorded in a portion of the first track of the magnetic disk corresponding to 22H through 262H, and image signals corresponding to 282H through 523H of the high vision mode are recorded in a portion of the third track of the magnetic disk corresponding to 22H through the first half of 263H, and a portion of the fourth track of the magnetic disk corresponding to the latter half of 284H. Image signals corresponding to 603H through 844H of the high vision mode are recorded in a portion of the first track of the magnetic disk corresponding to the first half of 263H and a portion of the second track of the magnetic disk corresponding to 284H through a latter half of 525H. Image signals corresponding to 845H through 1085H of the high vision mode are recorded in a portion of the fourth track of the magnetic disk corresponding to 285H through 525H.

Figure 13:
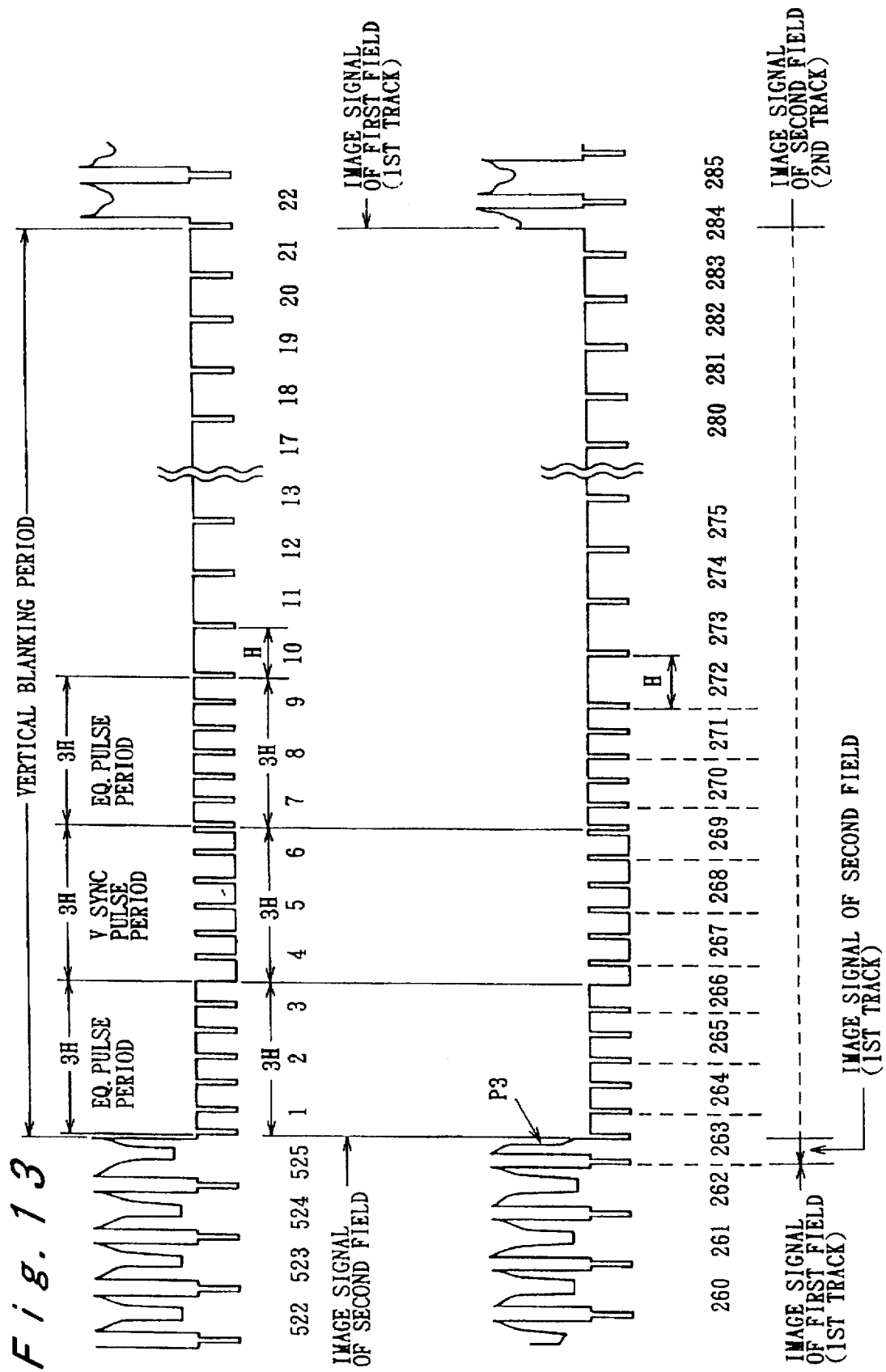
FIG. 13 is a diagram showing image signals corresponding to an upper half frame, in the second embodiment.

FIG. 13 shows signals which are recorded on the first and second tracks of the magnetic disk D and correspond to the upper half frame. As shogun in this drawing, the image of the first field is recorded from 22H through 262H, and the image of the second field is recorded from the first half of 263H (P3) of the first track and from the latter half of 284H through 525H of the second track. In the first track, the last horizontal scanning line ends at the mid point thereof, and in the second track, the first horizontal scanning line starts at the mid point thereof. Further, the last horizontal scanning line of the first track and the first horizontal scanning line of the second track form one horizontal scanning line positioned on an uppermost portion of the frame. Namely, since the horizontal scanning lines are connected to each other at the uppermost portion of the frame, noise may occur at the uppermost portion. However, since this portion is located at the periphery of the frame, this does not cause a problem in terms of image clarity.

Figure 14:
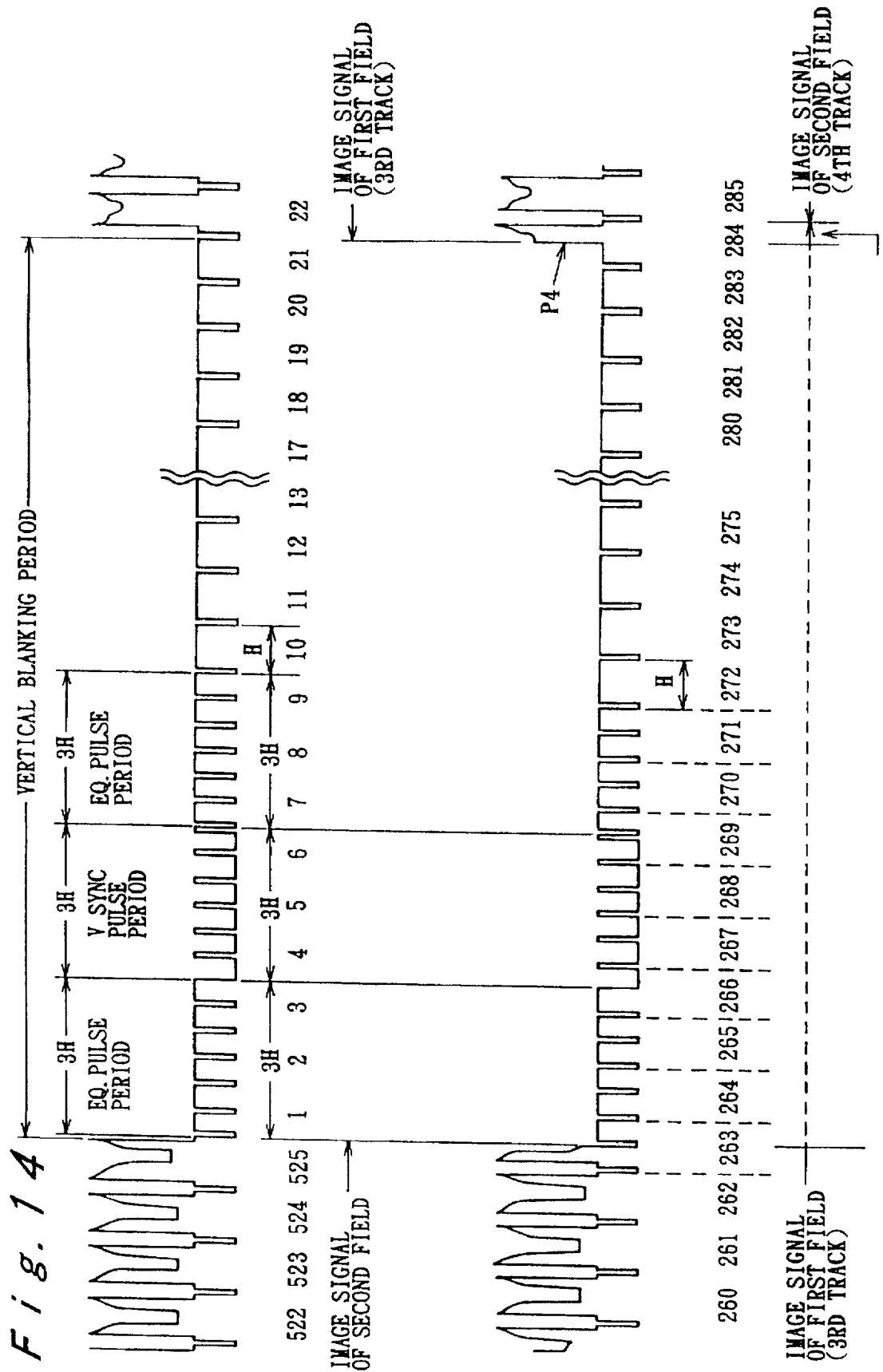
FIG. 14 is a diagram showing image signals corresponding to a lower half frame, in the second embodiment.

FIG. 14 shoves signals which are recorded on the third and fourth tracks of the magnetic disk D and correspond to the lower half frame. As shown in this drawing, the image of the first field is recorded from 22H through the first half of 263H of the first track and the latter half of 2841H (P4) of the fourth track. The image of the second field is recorded from 285H through 525H of the fourth track. In the third track, the last horizontal scanning line ends at the mid point thereof, and in the fourth track, the first horizontal scanning line starts at the mid point thereof. Further, the last horizontal scanning line of the third track and the first horizontal scanning line of the fourth track form one horizontal scanning line positioned on a lowermost portion of the frame. Namely, since the horizontal scanning lines are connected to each other at the lowermost portion of the frame, noise may occur at the lowermost portion. However, since this portion is located at the periphery of the frame, this does not cause a problem in terms of image clarity.

Figure 15:
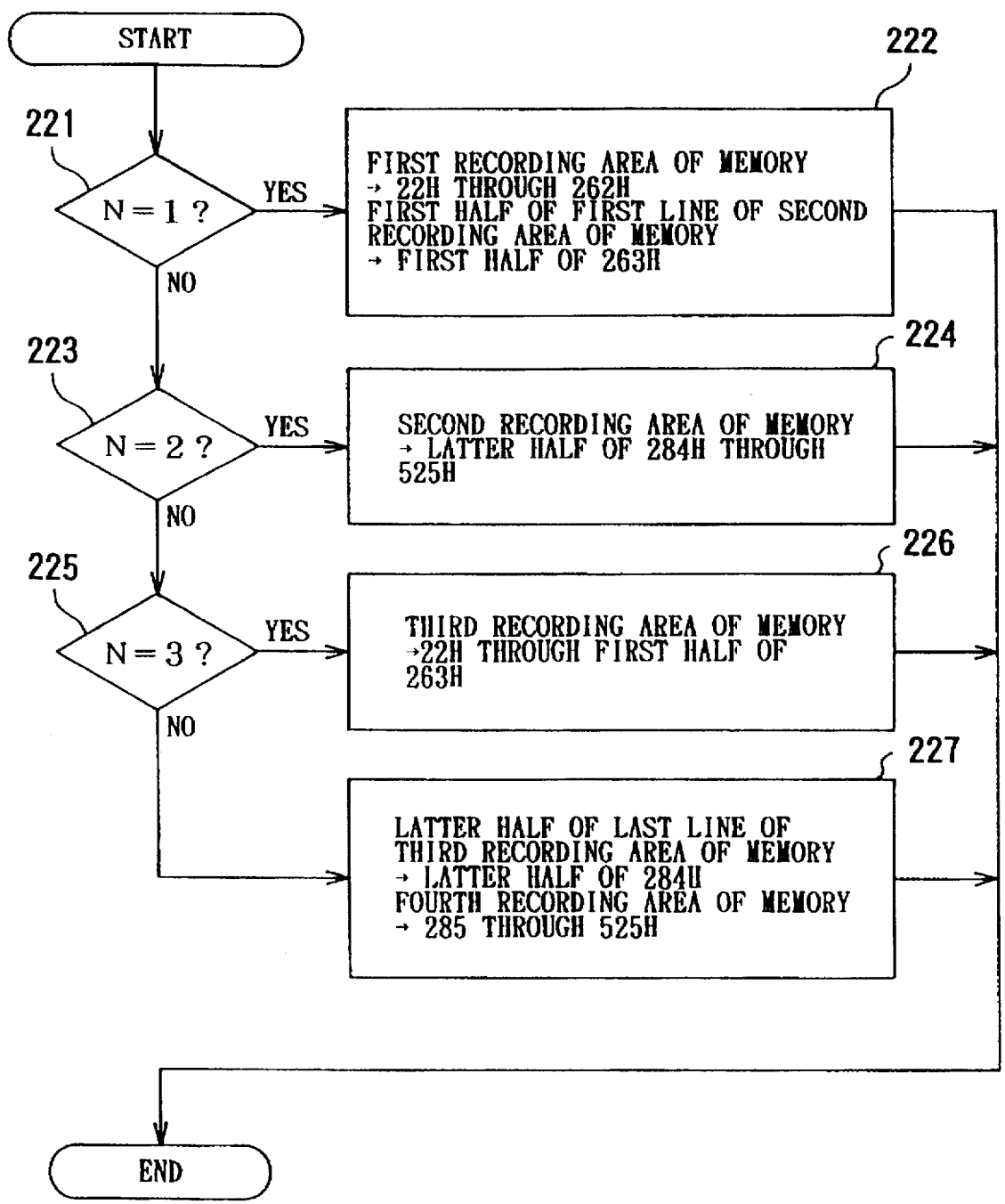
FIG. 15 is a flowchart of a program of a disk recording routine in the second embodiment.

FIG. 15 shows a disk recording routine of this embodiment. This disk recording routine is executed in Step 108 of the program shown in FIG. 4. Namely, in this embodiment, the program by which inputted image signals of one frame are divided into two parts and subsampled to be recorded on the magnetic disk is basically the same as in the first embodiment.

In Step 221, it is determined whether counter N is "1". When the counter N is "1", i.e., when image signals are recorded on the first track, in Step 222, image signals stored in the first recording areas of the memories are read out, and are recorded on the first track of the magnetic disk as image signals of horizontal scanning lines from 22H through 262H. Further, in Step 222, image signals corresponding to the first half of the uppermost horizontal scanning line and stored in the second recording areas are read out, and are recorded on the first track of the magnetic disk as image signals of the horizontal scanning line of the first half of 263H.

When the counter N is not "1", it is determined in Step 223 whether counter N is "2". When counter N is "2", Step 224 is executed. Namely, image signals stored in the second recording areas of the memories are read outs and are recorded on the second track of the magnetic disk as image signals of horizontal scanning lines from the latter half of 284H through 525H.

When counter N is not "2", it is determined in Step 225 whether counter N is "3". When counter N is "3", Step 226 is executed. Tn this Step, image signals stored in the third recording areas of the memories are read out, and are recorded on the third track of the magnetic disk as image signals of horizontal scanning lines from 22H through the first half of 263H.

When counter N is not "3", i.e., when counter N is "4", Step 227 is executed, and thus, image signals corresponding to the latter half of the lowermost horizontal scanning line and stored in the third recording areas of the memories are read outs and are recorded on the fourth track of the magnetic disk as image signals of the horizontal scanning line of the latter half of 284H. Further, in Step 227, image signals stored in the fourth recording area are read out, and are recorded on the fourth track of the magnetic disk as image signals of horizontal scanning lines from 285H through 525H.

In the recording operation of the image signals of horizontal scanning lines in Steps 222, 224, 226 and 227, similarly to the first embodiment (FIG. 5), the memory control circuit 22 designates an address corresponding to the scanning line specified in each of Steps, reads out data stored in the address and sequentially D/A converts the data to obtain analog image signals, which are recorded through the record processing circuits 35 and 36, the adder 38, the recording amplifier 13 and the magnetic head 11, on a track of the magnetic disk with a predetermined format.

Thus, the image signals are recorded on predetermined tracks of the magnetic disk in the form shown in FIGS. 13 and 14.

Note, the constructions of a recording system and a reproducing system are the same as those of the first embodiment which are shown in FIGS. 1 and 10.

As described above, in the second embodiment, since one frame is divided into two parts by the straight line parallel to the horizontal scanning lines, one horizontal scanning line is not divided at the center of the frame. Therefore, when the divided partial frames are reproduced and combined with each other, a connecting point of the horizontal scanning line does not occur at the central portion of the frame. Further, in each track of the magnetic disk, although the first and last horizontal scanning lines are divided at the mid portions thereof, these horizontal scanning lines are connected to the last or first horizontal scanning line of another track thus forming horizontal scanning lines located at the end portions of the frame. Namely, since all the horizontal scanning lines are used for forming a frame, the number of horizontal scanning lines of a reproduced frame is not reduced in comparison with the original number of horizontal scanning lines.

Note, although image signals are recorded in the frame recording mode in the first and second embodiments, the present invention can be applied to a field recording mode in which one frame is composed of one field.

Further, the present invention can be applied to a still video device in which image signals recorded in the PAL mode are recorded on a magnetic disk in the NTSC mode. In this case, it is not necessary for one frame to be divided into two parts and recorded on two tracks. Namely, image signals of one field are recorded on one track. Still further, the present invention can be applied to a still video device in which image signals recorded in the NTSC mode are recorded on a magnetic disk in the PAL mode.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications Nos. 4-174716 and 4-174717 (both filed on Jun. 9, 1992) which are expressly incorporated herein by reference in their entirety.

We claim:

1. A device for storing an image signal, corresponding to a single image, to a storage medium, in which the single image is formed in a frame mode, comprising:

means for dividing said image signal formed in said frame mode into at least two sub-frames by a dividing line that runs parallel to a plurality of horizontal scan lines that form said image signal frame, each sub-frame having at least one field; and a recorder that records said at least one field of each sub-frame to a specific location of a storage medium in such a manner that a first sub-frame of said at least two sub-frames contains a complete final horizontal scan line and a final sub-frame of said at least two sub-frames contains a complete initial horizontal scan line, so as to prevent the occurrence of a join indication in a reproduced image.

2. The device of claim 1, wherein said first sub-frame comprises an upper frame of said image signal frame and said final sub-frame comprises a lower frame of said image signal frame.

3. The device of claim 2, wherein said complete final horizontal scan line comprises a bottom horizontal scan line of said upper frame, and said complete initial horizontal scan line comprises a first horizontal scan line of said lower frame.

4. The device of claim 1, wherein a storage capacity of each specific location of said storage medium is equal to one another.

5. The device of claim 1, wherein said dividing means divides said frame into said at least two sub-frames at a position approximately centrally of said frame.

6. The device of claim 5, wherein for said first sub-frame, said recorder records a complete uppermost horizontal scan line and other horizontal scan lines of a first field of said plurality of horizontal scan lines to a first specific location of said storage medium, and records a latter half of said uppermost horizontal scan line and other horizontal scan lines of a second field of said plurality of horizontal scan lines to a second specific location of said storage medium.

7. The device of claim 5, wherein for said first sub-frame, said recorder records a first half of an uppermost horizontal scan line of a second field of said plurality of horizontal scan lines and a complete uppermost horizontal scan line and other horizontal scan lines of a first field of said plurality of horizontal scan lines to a first specific location of said storage medium, and records a latter half of said uppermost horizontal scan line and other horizontal scan lines of said second field of said plurality of horizontal scan lines to a second specific location of said storage medium.

8. The device of claim 5, wherein for said final sub-frame, said recorder records a first half of a lowermost horizontal scan line and other horizontal scan lines of a first field of said plurality of horizontal scan lines to a first specific location of said storage medium, and records a latter half of said lowermost horizontal scan line of a first field of said plurality of horizontal scan lines and a complete lowermost horizontal scan line and other horizontal scan lines of a second field of said plurality of horizontal scan lines to a second specific location of said storage medium.

9. The device of claim 5, wherein for said final sub-frame, said recorder records a first half of a lowermost horizontal scan line and other horizontal scan lines of a first field of said plurality of horizontal scan lines to a first specific location of said storage medium, and records a complete lowermost horizontal scan line and other horizontal scan lines of a second field of said plurality of horizontal scan lines to a second specific location of said storage medium.

10. The device of claim 1, wherein said dividing means comprises:

a memory that stores said image signal of said frame; and means for reading said stored image signal from said memory, said reading means setting an address of said memory that corresponds to said dividing line at which said frame is divided.

11. The device of claim 1, wherein said at least two sub-frames comprise an upper frame and a lower frame of said image signal frame, said upper frame comprising a first field and a second field, and said lower frame comprising a first field and a second field.

12. A device for storing an image signal corresponding to a single image formed in two fields of a frame mode, comprising:

means for dividing a frame of said image signal into an upper frame and a lower frame by a dividing line parallel to horizontal scan lines of said image signal frame, each of said upper frame and said lower frame comprising said two fields of said frame; and a storage medium that stores said image signal, a first field of said upper frame of said image signal frame being stored in a first location of said storage medium, a second field of said upper frame of said image signal frame being stored in a second location of said storage medium, a first field of said lower frame of said image signal frame being stored in a third location of said storage medium, and a second field of said lower frame of said image signal frame being stored in a fourth location of said storage medium, said upper frame and said lower frame being stored in such a manner that said upper frame contains a complete final horizontal scan line and said lower frame contains a complete initial horizontal scan line, so as to prevent the occurrence of a loin indication in a reproduced image.

13. The device of claim 12, further comprising means for dividing a first horizontal scan line of said upper frame into a first portion and a second portion that are stored in different locations of said storage medium.

14. The device of claim 13, wherein said first horizontal scan line of said upper frame is located at a top of said upper frame.

15. The device of claim 13, further comprising means for dividing a last horizontal scan line of said lower frame into a first portion and a second portion that are stored in different locations of said storage medium.

16. The device of claim 15, wherein said last horizontal scan line of said lower frame is located at a bottom of said lower frame.

17. The device of claim 12, wherein said dividing means divides said frame into said upper frame and said lower frame at a position approximately centrally of said frame.

18. The device of claim 12, wherein said dividing means comprises:

a memory that stores said image signal of said frame; and means for reading said stored image signal from said memory, said reading means setting an address of said memory that corresponds to said dividing line at which said frame is divided.

19. A device for storing an image signal corresponding to a single image formed in a frame mode, comprising:

means for dividing a frame of said image signal formed in said frame mode into an upper sub-frame and a lower sub-frame without cutting across a horizontal scan line of said image signal frame, said upper sub-frame and said lower sub-frame each comprising a plurality of fields; and a recording medium that stores a portion of one horizontal scan line of said upper sub-frame with horizontal scan lines of said lower sub-frame in such a manner that a complete final horizontal scan line is stored in said upper sub-frame and a complete initial horizontal scan line is stored in said lower sub-frame, so as to prevent the occurrence of a join indication in a reproduced image.

20. The device of claim 19, wherein a portion of a final horizontal scan line of said lower sub-frame is stored in said recording medium.

21. The device of claim 19, further comprising means for dividing a first horizontal scan line of said upper sub-frame into a first portion and a second portion that are stored in different specific locations of said recording medium.

22. The device of claim 21, further comprising means for dividing a last horizontal scan line of said lower sub-frame into two portions that are stored in different specific locations of said recording medium.

23. The device of claim 21, wherein a first half of said last horizontal line is stored with horizontal scan lines of said lower sub-frame and a second half of said last horizontal scan line is stored with horizontal scan lines of said upper sub-frame.

24. A device for recording an image signal, corresponding to a single image, to a storage medium, a frame of said image signal having a first field and a second field, comprising:

means for storing said image signal to a memory having first through fourth recording areas in such a manner that said image signal frame is divided into first and second sub-frames by a straight line substantially parallel to a plurality of horizontal scanning lines that form said image signal frame, a first field of said first sub-frame, a second field of said first sub-frame, a first field of said second sub-frame and a second field of said second sub-frame being stored in said first through fourth recording areas, respectively; and means for recording each of said first field of said first sub-frame, said second field of said first sub-frame, said first field of said second sub-frame, and said second field of said second sub-frame, to a specific location of said storage medium, so as to prevent the occurrence of a join indication in a reproduced image.

25. The device of claim 24, wherein said first sub-frame comprises an upper frame of said image signal frame, and said second sub-frame comprises a lower frame of said image signal frame.

26. The device of claim 25, wherein each of said first and second fields of said first sub-frame contain a complete final horizontal scan line located at a bottom of said upper frame, and each of said first and second fields of said second sub-frame contain a complete initial horizontal scan line located at a top of said lower frame.

27. The device of claim 24, wherein said straight line divides said frame into said first and second sub-frames at a position approximately centrally of said frame.

28. The device of claim 27, wherein for said first sub-frame, said recording means records a complete uppermost horizontal scan line and other horizontal scan lines of a first field of said plurality of horizontal scan lines to a first specific location of said storage medium, and records a latter half of said uppermost horizontal scan line and other horizontal scan lines of a second field of said plurality of horizontal scan lines to a second specific location of said storage medium.

29. The device of claim 27, wherein for said first sub-frame, said recording means records a first half of an uppermost horizontal scan line of a second field of said plurality of horizontal scan lines and a complete uppermost horizontal scan line and other horizontal scan lines of a first field of said plurality of horizontal scan lines to a first specific location of said storage medium, and records a latter half of said uppermost horizontal scan line and other horizontal scan lines of a second field of said plurality of horizontal scan lines to a second specific location of said storage medium.

30. The device of claim 27, wherein for said second sub-frame, said recording means records a first half of a lowermost horizontal scan line and other horizontal scan lines of a first field of said plurality of horizontal scan lines to a first specific location of said storage medium, and records a complete lowermost horizontal scan line and other horizontal scan lines of a second field of said plurality of horizontal scan lines to a second specific location of said storage medium.

31. The device of claim 27, wherein for said second sub-frame, said recording means records a first half of a lowermost horizontal scan line and other horizontal scan lines of a first field of said plurality of horizontal scan lines to a first specific location of said storage medium, and records a latter half of said lowermost horizontal scan line of a first field of said plurality of horizontal scan lines and a complete lowermost horizontal scan line and other horizontal scan lines of a second filed of said plurality of horizontal scan lines to a second specific location of said storage medium.

* * * * *